United States Patent [19]

Morimoto

[11] Patent Number: 4,986,396
[45] Date of Patent: Jan. 22, 1991

[54] CONTROL SYSTEM FOR A CLUTCH OF A MOTOR VEHICLE

[75] Inventor: Yoshihiko Morimoto, Tokyo, Japan

[73] Assignee: Fuji Jukogyo Kabushiki Kaisha, Tokyo, Japan

[21] Appl. No.: 300,443

[22] Filed: Jan. 18, 1989

[30] Foreign Application Priority Data

| Jan. 29, 1988 | [JP] | Japan | 63-18972 |
| Jan. 29, 1988 | [JP] | Japan | 63-18973 |
| Jan. 29, 1988 | [JP] | Japan | 63-18974 |

[51] Int. Cl.$^5$ .............................................. B60K 41/28
[52] U.S. Cl. ................................ 192/0.052; 192/0.076
[58] Field of Search ................. 192/0.075, 0.076, 0.052

[56] References Cited

U.S. PATENT DOCUMENTS

| 4,061,217 | 12/1977 | Toyota et al. | 192/0.052 |
| 4,295,551 | 10/1981 | Zimmermann et al. | 192/0.076 |
| 4,403,682 | 9/1983 | Norris et al. | 192/0.076 X |
| 4,433,594 | 2/1984 | Smirl | 74/701 X |
| 4,440,279 | 4/1984 | Schreiner | 192/111 A X |
| 4,561,530 | 12/1985 | Parsons et al. | 192/111 A X |
| 4,646,891 | 3/1987 | Braun | 192/0.076 X |
| 4,648,496 | 3/1987 | Petzold et al. | 192/0.076 |
| 4,665,773 | 5/1987 | Hiramatsu et al. | 192/0.076 |
| 4,700,590 | 10/1987 | Omitsu | 74/872 X |
| 4,766,544 | 8/1988 | Kurihara et al. | 192/0.052 |

FOREIGN PATENT DOCUMENTS

| 0193412 | 9/1986 | European Pat. Off. | 192/0.075 |
| 2927175 | 2/1981 | Fed. Rep. of Germany | 192/0.075 |
| 0034525 | 2/1985 | Japan | 192/0.075 |
| 60-78119 | 2/1985 | Japan . | |
| 0024831 | 2/1986 | Japan | 192/0.075 |
| 0072921 | 4/1988 | Japan | 192/0.075 |

*Primary Examiner*—Rodney H. Bonck
*Attorney, Agent, or Firm*—Martin A. Farber

[57] ABSTRACT

A system for controlling a friction clutch of a motor vehicle having a continuously variable transmission. The system has an actuator for shifting a clutch plate of the clutch. Vehicle start intention is detected in accordance with a first depression of an accelerator pedal. In response to the vehicle start intention, the actuator operates to shift the clutch plate to a partial engagement position at a maximum speed. The clutch plate is kept at the position and then the clutch plate is shifted from the partial engagement position to an entire engagement position, when the transmission is upshifted.

9 Claims, 15 Drawing Sheets

CONTROL SYSTEM FOR A CLUTCH OF A MOTOR VEHICLE

BACKGROUND OF THE INVENTION

The present invention relates to a control system for a dry-plate friction clutch for an automatic transmission of a motor vehicle.

A control system for automatically controlling a friction clutch is known, which is controlled to be engaged for starting the vehicle and to be released before stopping of the vehicle.

Japanese Patent Application Laid-Open No. 60-78119 discloses a clutch control system where a clutch is gradually engaged at the start of the vehicle by operating the clutch at three different speed stages. The operation proceeds from the first stage to the second stage, and from the second stage to the third stage when vehicle speed reaches respective predetermined reference speeds.

However, in the above-described system, it is difficult to detect the position of a clutch plate from which the second stage starts. Moreover, although the third stage starts at the predetermined vehicle speed, the clutch may not be sufficiently engaged at the stage. Consequently, the complete engagement of the clutch at the end of the third stage causes a shock. If such a control system is used in with a continuously variable transmission, shock occurs twice, that is, at the lock-up of the clutch and at a start of the upshifting of the transmission, which reduces the driveability of the vehicle.

In addition, since the speed stages are fixed regardless of the differences in engine load at the start of the vehicle, the partial engagement state becomes longer than necessary at low engine load, and the slipping period of the clutch increases at heavy engine load.

SUMMARY OF THE INVENTION

The object of the present invention is to provide a system for controlling a clutch for a continuously variable transmission which may smoothly engage the clutch so as to improve starting characteristic of a vehicle.

According to the present invention, there is provided a system for controlling a friction clutch of a motor vehicle having an engine with a throttle valve, a continuously variable transmission, a transmission ratio control system for the transmission, and an accelerator pedal, comprising an accelerator switch for producing an accelerator signal when the accelerator pedal is depressed, a select position sensor for producing a select signal when a drive range of the transmission is selected, an actuator for operating a clutch plate of the clutch, vehicle start intention detector means responsive to the accelerator signal and to the select signal for detecting the start of the depression of the accelerator pedal and for producing a partial engagement signal, control means responsive to the partial engagement signal for operating the actuator to shift the clutch plate to a partial engagement position at a maximum speed, for keeping the clutch plate at the position and then for shifting the clutch plate from the partial engagement position to an entire engagement position.

In an aspect of the invention, upshift detector means is provided for producing an upshift signal when the transmission starts to upshift, and the control means responds to the upshift signal to shift the clutch plate to the entire engagement position.

DETAILED DESCRIPTION OF THE PREFERRED EMBODIMENTS

Figure 1:
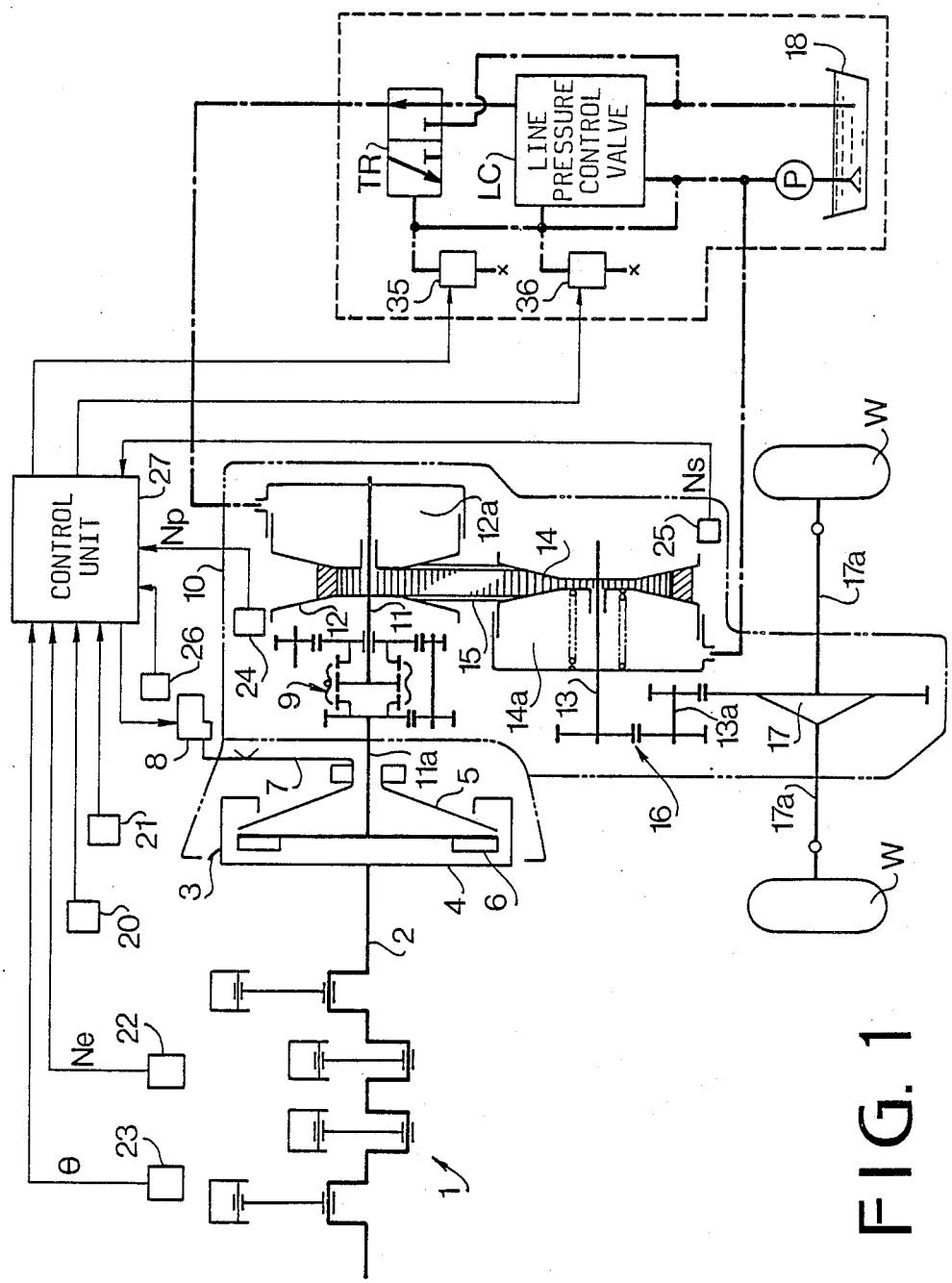
FIG. 1 is a schematic illustration of a system for controlling a friction clutch for a motor vehicle.

Referring to FIG. 1, a crankshaft 2 of an engine 1 is operatively connected to a dry-plate friction clutch 3 for transmitting the power of the engine 1 to a continuously variable belt-drive automatic transmission 10 through a selector mechanism 9. The output of the belt-drive transmission 10 is transmitted to axles 17a of vehicle driving wheels W through an output shaft 13, a pair of intermediate reduction gears 16, an intermediate shaft 13a, and a differential 17.

The clutch 3 comprises a flywheel 4 connected to the crankshaft 2 of the engine 1, a clutch plate 6 opposed to the flywheel 4 and secured to an input shaft 11a the transmission 10, and a diaphragm spring 5. The diaphragm spring 5 is operated by way of a release lever 7 by a DC motor 8 as an actuator. The DC motor 8 is actuated by drive pulses, and the rotation thereof is converted into a rectilinear motion to shift the release lever 7. When the drive pulses are cutoff, the rotation of the DC motor 8 is stopped by a braking device provided therein to hold the release lever 7 at a position. For example, when the DC motor 8 is rotated in one direction, the diaphragm spring 5 is actuated by the release lever 7 to push the clutch plate 6 against the flywheel 4. Thus, the clutch 3 is mechanically engaged by a frictional force, thereby transmitting the output of the crankshaft 2 to the input shaft 11a. On the other hand, when the DC motor is rotated in the opposite direction, the clutch 3 is disengaged. The ratio of the drive pulses applied to the motor 8 is variable so as to control the rotational speed.

In the belt-drive automatic transmission 10, the selector mechanism 9 is provided between the input shaft 11a and a main shaft 11. The selector mechanism 9 is provided with a synchromesh mechanism comprising gears, hub, and sleeve for connecting the input shaft 11a and the main shaft 11 to selectively provide a driving position (D-range), neutral position (N-range) and a reverse driving position (R-range).

The continuously variable belt-drive automatic transmission 10 has the main shaft 11 and the output shaft 13 provided in parallel with the main shaft 11. A drive pulley 12 provided with a hydraulic cylinder 12a is mounted on the main shaft 11. A driven pulley 14 provided with a hydraulic cylinder 14a is mounted on the output shaft 13. A drive belt 15 engages with the drive pulley 12 and the driven pulley 14. Hydraulic cylinders 12a and 14a are communicated with an oil hydraulic control circuit. The cylinder 12a is supplied with pressurized oil by an oil pump P from an oil reservoir 18 passing through a line pressure control valve LC and a transmission ratio control valve TR. The cylinder 14a is applied with pressurized oil from the pump P. The hydraulic control circuit is responsive to vehicle speed, engine speed and throttle valve position for controlling the amount of oil supplied to the cylinders 12a and 14a. The pulleys 12 and 14 are operated by compressive forces of cylinders so that the running diameter of belt 15 is varied to infinitely change the transmission ratio.

An electronic control system for the clutch 3 and the belt-drive transmission 10 has an engine speed sensor 22, and rotating speed sensors 24 and 25 for respectively sensing rotating speeds of drive pulley 12 and the driven pulley 14. A selector lever connected to the selector mechanism 9 is provided with a select position sensor 20 for sensing the driving position (D), neutral position (N) and the reverse position (R). An accelerator pedal switch 21 is provided for sensing the depression of an accelerator pedal, and a throttle position sensor 23 is provided. A clutch plate position sensor 26 is further provided adjacent the DC motor 8 for sensing an actual position of the clutch plate 6.

Output signals of the sensors and pulses of the switches are applied to an electronic control unit 27 which produces a control signal to the motor 8 and a control signal for controlling the transmission ratio (i) and a line pressure control signal to the oil hydraulic control circuit for the transmission.

Figure 2A:
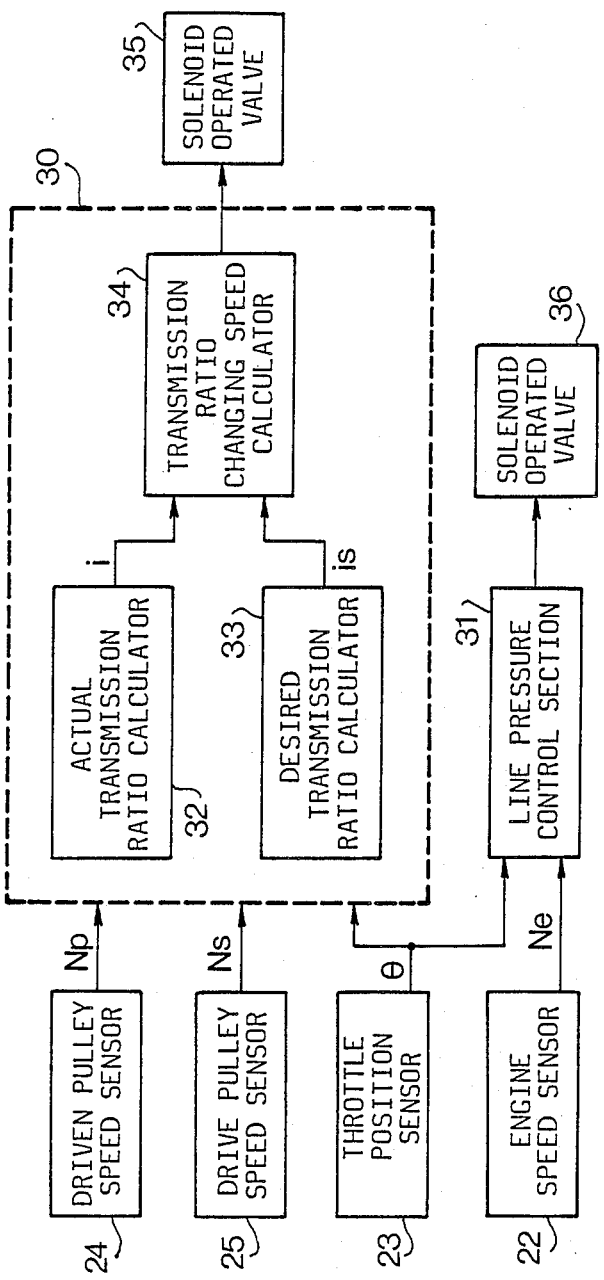
FIGS. 2a and 2b show a block diagram of a control unit according to the present invention.
Figure 2B:
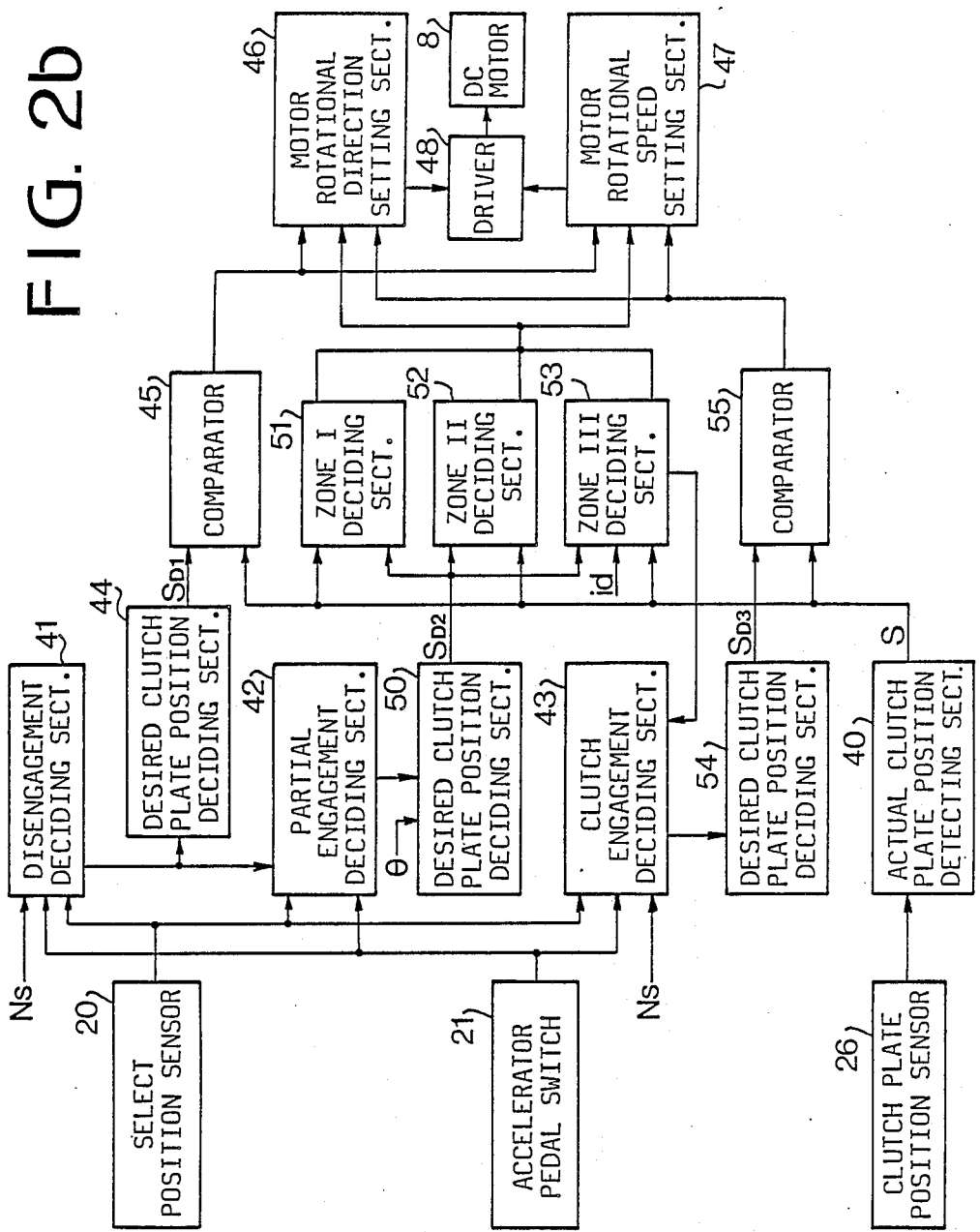

Referring to FIGS. 2a and 2b showing the control unit 27 of FIG. 1, a transmission ratio changing speed control section 30 comprises an actual transmission ratio calculator 32 to which output signals $N_P$ and $N_S$ of sensors 24, 25 are fed to produce an actual transmission ratio i in accordance with $i = N_P/N_S$. The transmission changing speed control section 30 further has a desired transmission ratio calculator 33 where a desired transmission ratio id is calculated in accordance with a desired drive pulley speed Npd, which is derived from a table, and the driven pulley speed $N_S$. The desired transmission ratio id is fed to a transmission ratio changing speed calculator 34 which produces a desired transmission ratio changing speed (rate) di/dt. The speed di/dt is the amount of change of the desired transmission ratio id during a predetermined time interval. A duty ratio signal dependent on the desired transmission ratio changing speed di/dt is applied to a solenoid operated valve 35. The valve 35 is provided in the hydraulic circuits, for shifting a spool of the transmission ratio control valve TR to control the transmission ratio of the transmission.

A line pressure control section 31 is applied with an engine speed signal Ne from the sensor 22 and throttle opening degree $\theta$ from the sensor 23 to obtain an engine torque T. A desired line pressure $P_{LD}$ is obtained in accordance with the engine torque T and the actual transmission ratio i. A duty ratio signal corresponding to the desired line pressure $P_{LD}$ is applied to a solenoid operated valve 36. The valve 36 is provided in the hydraulic circuit, for shifting a spool of the line pressure control valve LC to control the line pressure.

Figure 3A:
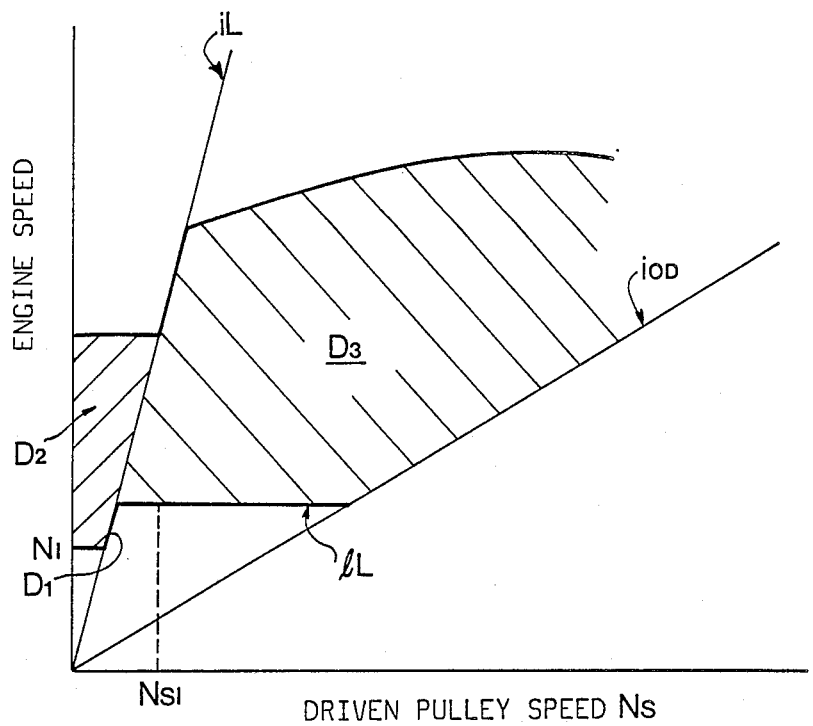
FIG. 3a is a graph showing clutch engagement zones.

A system for controlling the clutch 3 is described hereinafter with reference to FIG. 2b. The control unit comprises an actual clutch plate position detecting section 40 applied with a signal from the clutch plate position sensor 26 for obtaining an actual clutch plate position S, a clutch disengagement deciding section 41, a clutch partial engagement deciding section 42 and a clutch engagement deciding section 43. The driven pulley rotational speed $N_S$ is applied to the deciding sections 41 and 43 and signals from the select position sensor 20 and the accelerator pedal switch 21 are applied to the deciding sections 41 to 43. The deciding sections 41 to 43 are provided to decide a condition in which the clutch 3 is desired to be in accordance with an intention of the driver whether to start the vehicle or not. The disengagement of the clutch 3 is decided when a parking range (P-range) or a neutral range (N-range) is selected, or when the vehicle is driven while the accelerator pedal is released at the D-range or the R-range and when the driven pulley rotational speed $N_S$ becomes lower than a predetermined reference value $N_{S1}$. The clutch disengagement range during the deceleration of the vehicle is designated by a solid wide line D1 in FIG. 3a showing a transmission operation pattern. Namely the line D1 is on an idle speed line $N_I$, a largest transmission ratio line $i_L$ and on minimum transmission ratio changing line 1 L below the driven pulley speed $N_{S1}$.

The partial engagement of the clutch is determined when the disengagement of the clutch was decided at the last program for controlling the clutch 3 and the accelerator switch 21 has been closed at D-range or R-range. Thus, a clutch partial engagement zone D2 is a zone where the transmission ratio is larger than the largest transmission ratio line $i_L$ above the clutch disengagement line D1 as shown in FIG. 3a.

On the other hand, the entire engagement of the clutch is decided after the partial engagement of the clutch. Thus, an engagement zone D3 is shown in FIG. 3a between the smallest and largest transmission ratio lines $i_L$ and $i_{OD}$, above the minimum transmission ratio changing line 1L.

Figure 3B:
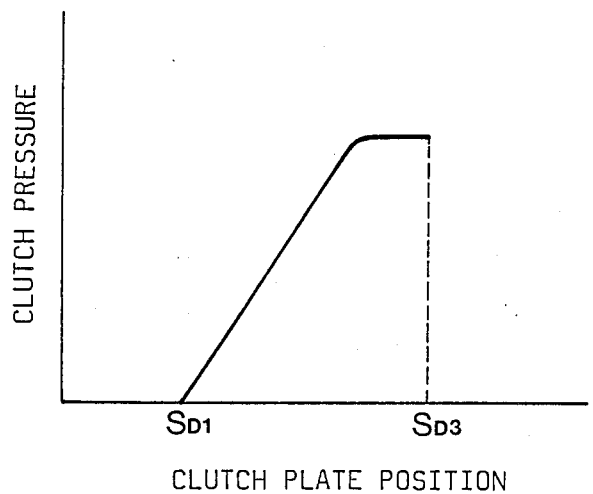
FIG. 3b is a graph showing a characteristic of the clutch.
Figure 3C:
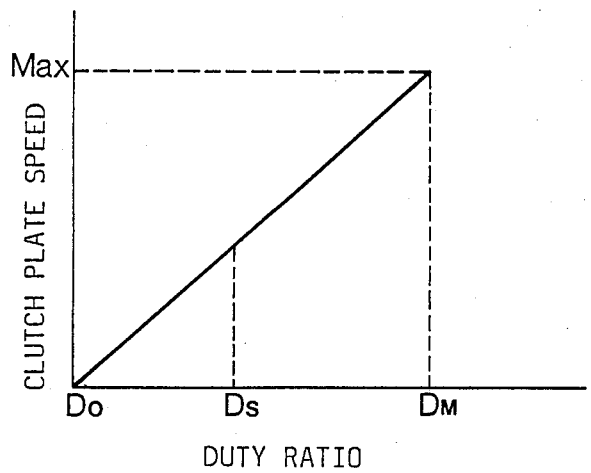
FIG. 3c is a graph showing a relationship between duty ratio of a motor drive current for operating the clutch and clutch plate speed.

An output signal of the clutch disengagement deciding section 41 is applied to a desired clutch position deciding section 44 where a desired clutch plate position $S_{D1}$ in the disengagement state of the clutch is set to a position at which the clutch plate 6 is slightly apart from the flywheel 4, determined in dependency on a characteristic of the clutch 3 shown in FIG. 3b. The desired clutch plate position $S_{D1}$ and the actual clutch position S are applied to a comparator 45, an output signal of which is applied to a motor rotational direction setting section 46 and a motor rotational speed setting section 47. The rotational speed setting section 47 determines shifting speed of the release lever 7 and duty ratio D of the motor drive pulses dependent on the shifting speed. The duty ratio D is proportional to the speed of the clutch plate 6 as shown in FIG. 3c. A duty ratio signal corresponding to the duty ratio D and a direction signal is fed to a DC motor through a driver 48. Therefore when the release lever 7 is positioned so that the clutch plate 6 is not close enough to the flywheel 4 than the desired position $S_{D1}$ ($S<S_{D1}$), the motor rotational direction deciding section 46 produces a clutch engaging direction signal and the rotational speed deciding section 47 produces a predetermined duty ratio signal $D_S$. Thus, the clutch plate 6 is shifted to the desired position $S_{D1}$ close to the flywheel 4 at the speed dependent on the duty ratio $D_S$. To the contrary, when the actual position of the clutch plate is closer to the flywheel 4 than the desired position ($S>S_{D1}$), a disengaging direction signal and the duty ratio signal $D_S$ are produced. If the actual position coincides with the desired position, a zero duty ratio signal D0 is produced so that the motor is not driven.

Figure 3D:
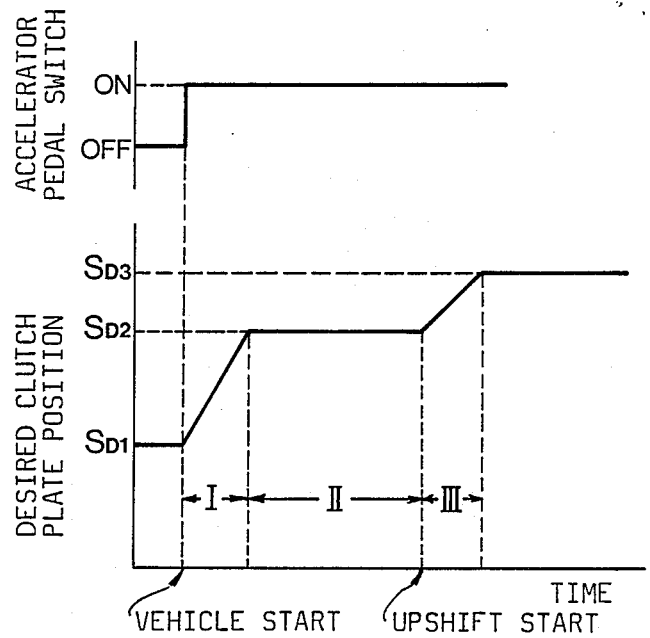
FIG. 3d is a graph showing clutch plate position.

The partial engagement state is divided into three zones I, II and III as shown in FIG. 3d. A clutch plate position $S_{D2}$ is a desired position.

In the zone I, the clutch plate approaches the desired partial engagement position, and in the zone II, the clutch plate is held at the desired partial engagement position. In the zone III, the clutch plate approaches an entire engagement position $S_{D3}$.

Figure 3E:
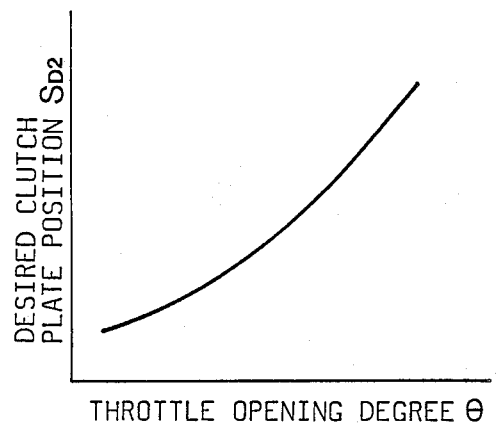
FIG. 3e is a graph showing a relationship between throttle opening degree and desired clutch plate position.

A desired clutch plate position deciding section 50 for partial engagement is supplied with the throttle opening degree $\theta$ to set desired clutch plate position $S_{D2}$ for the desired partial engagement state. The desired clutch plate position $S_{D2}$ is set as an increasing function of the throttle opening degree $\theta$ at the start of the vehicle as shown in FIG. 3e. The desired position $S_{D2}$ and the actual position S are applied to first zone I deciding section 51, second zone II deciding section 52 and third zone III deciding section 53. The deciding section 53 is further fed with the desired transmission ratio id from the calculator 33. It is determined at the deciding section 51 that the clutch is in the first zone I when the actual clutch plate position S of the lever 7 is under the desired position $S_{D2}$. The second zone II is determined at the deciding section 52 when the actual position S is at the desired position $S_{D2}$, and a third zone III is determined at the deciding section 53 when the actual clutch plate position S exceeds the desired position $S_{D2}$. As shown in FIG. 3d, the first zone I is a zone where engagement rate of the clutch 3 is increased by shifting the clutch plate 6 from the position $S_{D1}$ to $S_{D2}$ at the highest speed, the second zone II where the clutch plate is kept at the position $S_{D2}$, the third zone III where the engagement rate of the clutch is further increased so as to lock up the clutch at the same time as the transmission ratio starts to change, that is when the desired transmission ratio id becomes smaller than the largest transmission ratio $i_L$ (id<$i_L$). Output signals of the deciding sections 51 to 53 are applied to the rotational direction setting section 46 where the rotational direction signal is produced, and the rotational speed setting section 47 where an appropriate duty ratio depending on the zones is produced. Namely, the setting section 47 produces the maximum duty ratio signal $D_M$ for the zone I, the zero duty ratio signal $D_O$ for the zone II and the predetermined duty ratio signal $D_S$ for the third zone III to actuate the DC motor 8.

The desired clutch plate position $S_{D3}$ is set at an entire engagement position at a desired clutch plate position deciding section 54 for the clutch lock-up state. The desired clutch plate position $S_{D3}$ and actual position S are applied to a comparator 55. Output of the comparator 55 is applied to the motor rotational direction setting section 46 and the rotational speed setting section 47. When the clutch plate 6 is positioned so that the clutch 3 is not sufficiently engaged, ($S<S_{D3}$), the motor 8 is rotated in the clutch engaging direction at the duty ratio $D_S$. When the release lever 7 is so positioned as to completely engage the clutch 3 ($S \geq S_{D3}$), the motor 8 is not driven.

The operation of the control system of the clutch is described hereinafter with reference to FIGS. 4 to 7.

Figure 4:
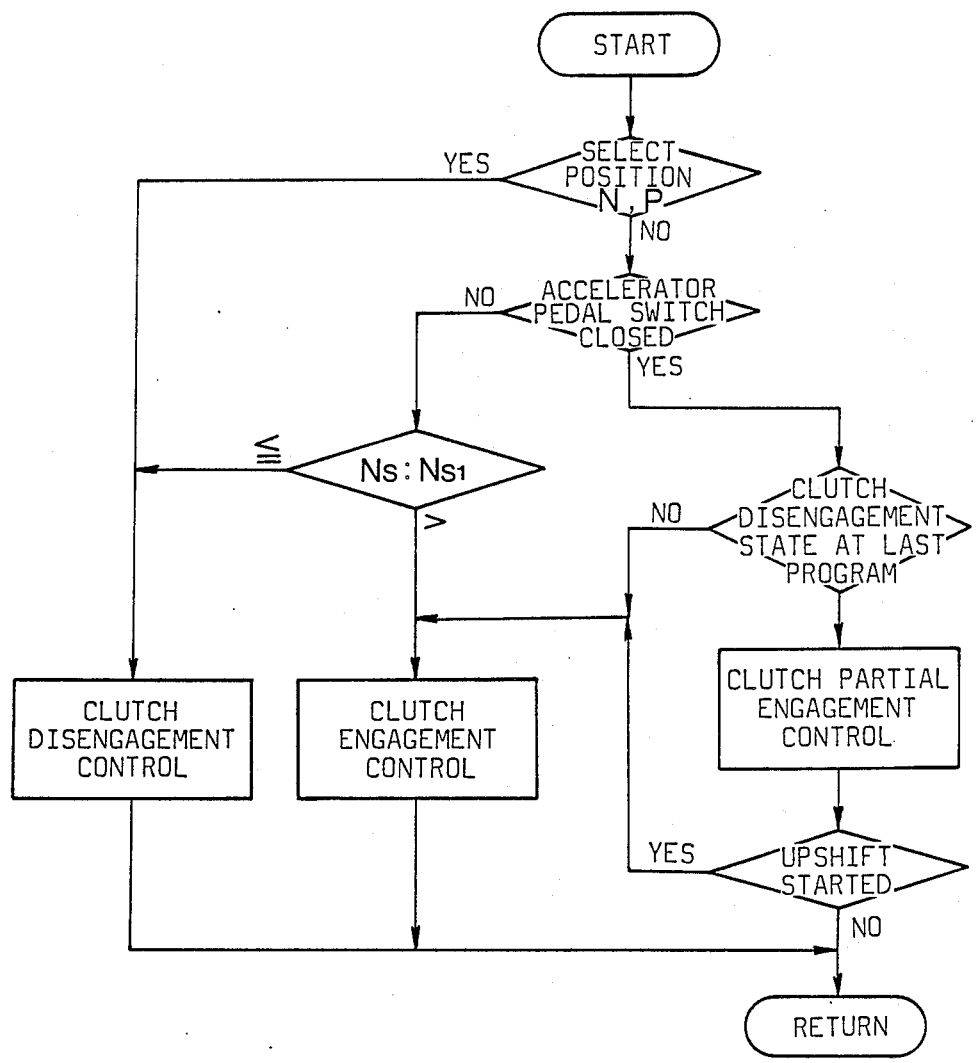
FIG. 4 is a flowchart describing a general operation for controlling the clutch.

Referring to FIG. 4 describing the general operation of the system, when the N-range or the P-range is selected, the disengagement of the clutch 3 is decided at the clutch disengagement deciding section 41. In the D-range and R-range, if the accelerator switch 21 is closed and the disengagement of the clutch had been decided at the last program, the partial engagement state is decided at the partial engagement deciding section 42. As soon as the transmission starts to upshift, the entire engagement of the clutch is decided. Furthermore, when the accelerator pedal switch 21 is open, if the vehicle speed (driven pulley speed) $N_S$ is higher than the predetermined speed $N_{S1}$, the clutch is entirely engaged. On the other hand, if the vehicle speed is lower than the $N_{S1}$, the clutch is disengaged, thereby preventing the engine from stalling.

Figure 5:
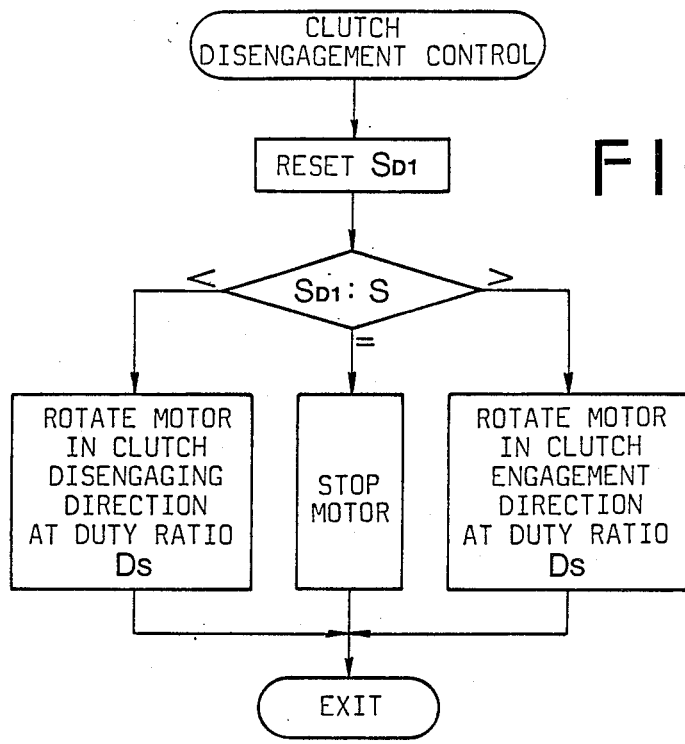
FIGS. 5, 6, 7a and 7b show flowcharts describing operations in clutch release state, clutch partial engagement state and clutch lock-up state, respectively.

As described in FIG. 5, when the clutch disengagement state is decided at the deciding section 41, the desired clutch plate position $S_{D1}$ is set and the actual position S is compared with the desired position. While the vehicle is at a stop, when the actual position S is in a position where the clutch plate 6 and the flywheel 4 are far apart, the DC motor is rotated in the engaging direction at a duty ratio $D_S$ so as to reduce the clearance or play in the clutch 3. Thus, the clutch 3 is positioned so as to be able to start engaging at any moment. When the actual position S is smaller than the desired position $S_{D1}$, the DC motor 8 is rotated in the opposite direction at the duty ratio $D_S$ to position the clutch plate at the desired position.

Figure 6:
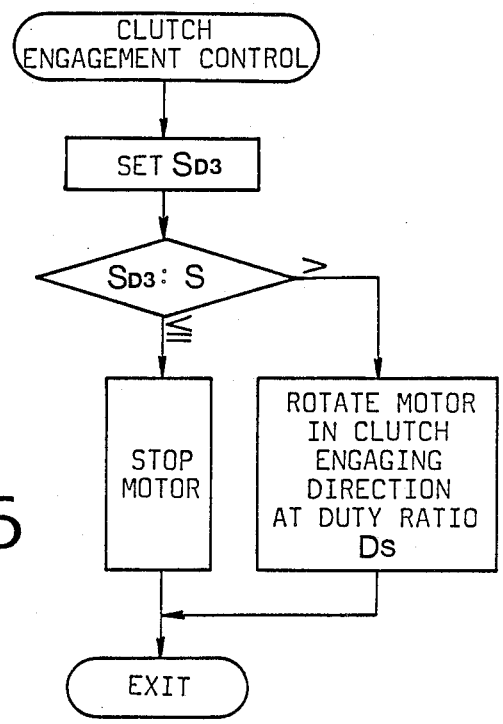

The engagement state is controlled as shown by the flowchart of FIG. 6. The clutch plate position S is compared with desired position $S_{D3}$ for the engagement of the clutch plate. When the clutch is not sufficiently engaged ($S<S_{D3}$), the DC motor 8 is rotated in the engaging direction at the duty ratio $D_S$. If the clutch is locked up ($S \geq S_{D3}$), the duty ratio of drive pulses for the motor becomes zero ($D_O$), and hence the motor 8 is not rotated, thereby keeping the clutch 3 locked up.

Figure 7A:
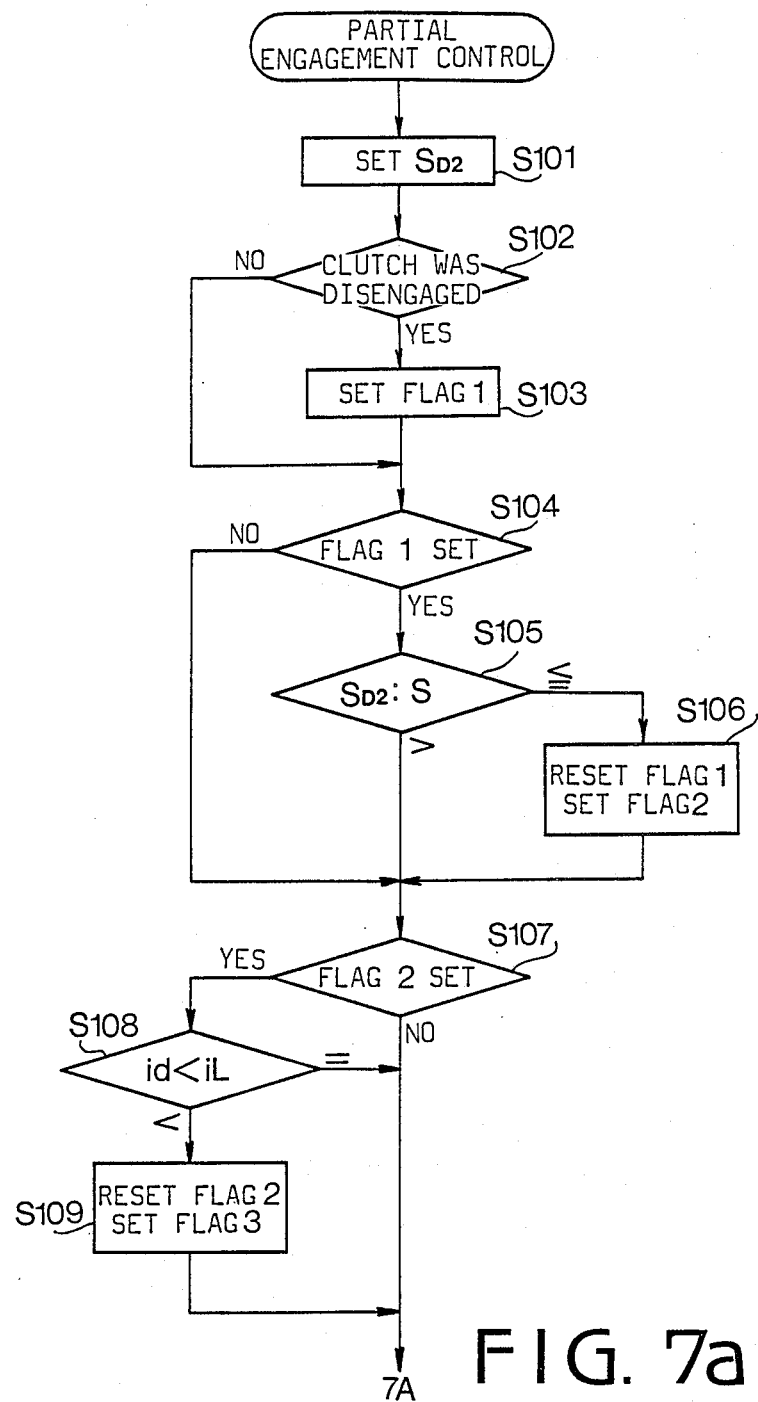
Figure 7B:
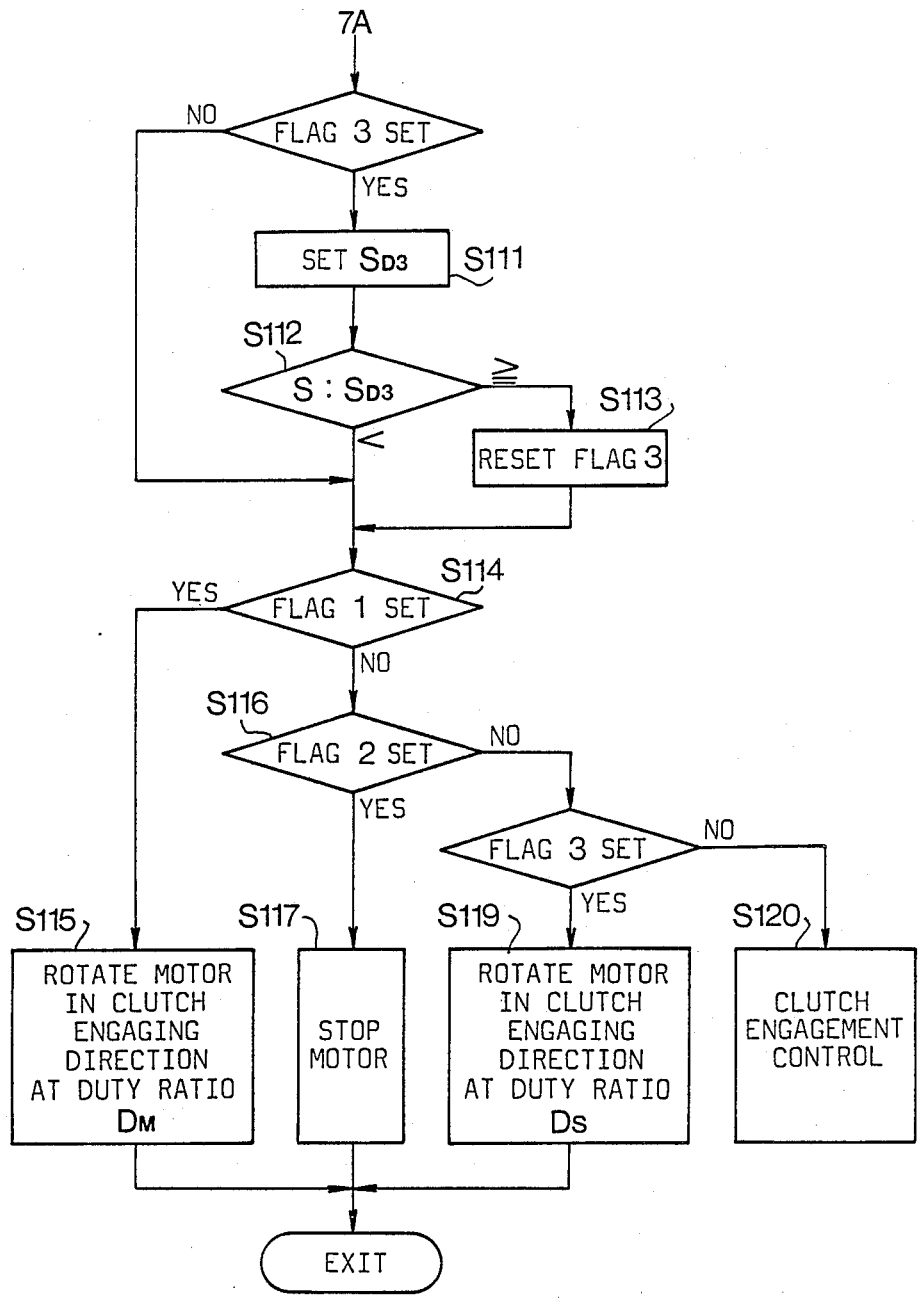

The operation for the partial engagement of the clutch is described hereinafter in detail with reference to FIG. 7. When the partial engagement state is determined, the desired clutch position $S_{D2}$ is obtained in dependency on the opening degree $\theta$ at a step S101. If the disengagement of the clutch was determined at the last program (S102), the program proceeds to a step S103 where a flag 1 is set, thereby selecting the first zone I. The program goes to a step S105 where the actual clutch position S is compared with the desired position $S_{D2}$. When the actual position S is under the desired position $S_{D2}$ ($S<S_{D2}$), the program proceeds to a step S114 passing through various steps, where it is confirmed that the flag 1 is set, and then to step S115. The motor 8 is rotated in the clutch engaging direction at the highest speed dependent on the maximum duty ration $D_M$. Thus, the clutch quickly goes into the partial engagement state and the vehicle is started.

If the actual position S coincides with or exceeds the desired position $S_{D2}$, the program goes to a step S106 where the flag 1 is reset and a flag 2 is set so as to select the second zone II. When it is determined that the desired transmission ratio id is equal to the largest transmission ration $i_L$ at a step S108 (the transmission is not yet upshifted), the program goes to a step S117. The motor 8 is applied with pulses at the zero duty ratio DOso as to keep the clutch position at $S_{D2}$.

When the desired transmission ratio id becomes smaller than the largest transmission ratio $i_L$ to upshift the transmission, the flag 2 is reset and a flag 3 is set at step S109 so as to select the third zone III. The program proceeds to a step S111 where the desired position $S_{D3}$ is set. The actual and desired clutch position S and $S_{D3}$ are compared at a step S112. When the clutch 3 is not sufficiently engaged ($S < S_{D3}$), the program goes to a step S119, thereby applying motor drive pulses at the duty ratio $D_S$ to rotate the motor 8 in the clutch engaging direction at a step S119. When it is determined that the clutch is sufficiently engaged at the step S112 ($S \geq S_{D3}$), the flag 3 is reset at a step S113. Consequently, it is determined that the flag 3 is not set at a step S120 so as to select the lock-up state. The clutch 3 is locked up substantially simultaneously as the start of the upshifting of the transmission. Thus, the pressure applied to the clutch 6 varies stepwisely during the partial engagement of the clutch 3.

Figure 8:
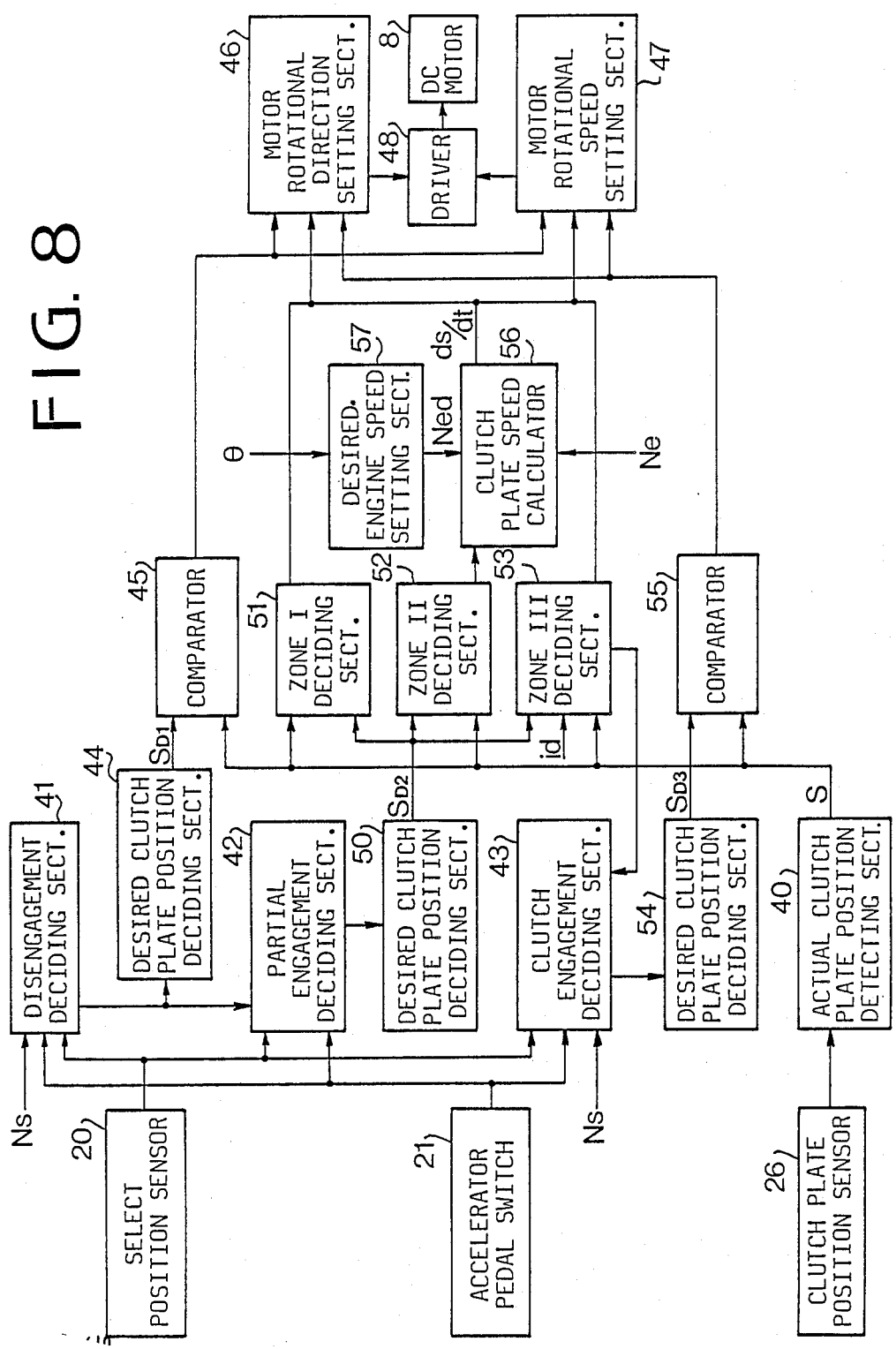
FIG. 8 is a block diagram showing a part of a control unit of a modification of the present invention.

FIG. 8 shows a modification of the present invention, where the control during the second zone II of the clutch partial engagement is carried out to prevent the engine speed from decreasing too rapidly when the clutch is engaged.

Figure 9:
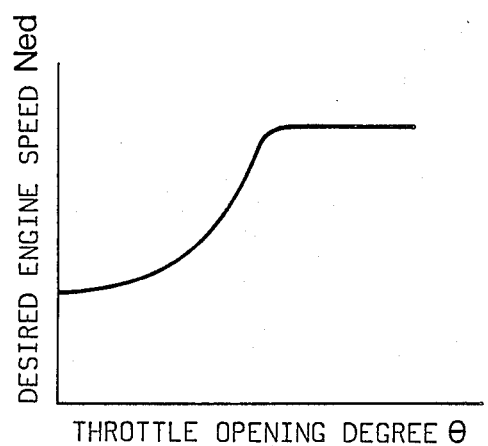
FIG. 9 is a graph showing a relationship between throttle opening degree and desired engine speed.

In addition to the control unit shown in FIGS. 2a and 2b, a desired engine speed setting section 57 to which the throttle opening degree $\theta$ is applied is provided. A desired engine speed Ned is determined in accordance with the throttle opening degree $\theta$ as shown in a graph of FIG. 9. Namely, the desired engine speed Ned is set to be at a low value at a small throttle opening degree and to increase rapidly after exceeding a predetermined degree.

The control unit is further provided with a clutch plate speed calculator 56 to which an output signal of the second zone II deciding section 52, actual engine speed Ne from the engine speed sensor 22 and the desired engine speed Ned from the desired engine speed setting section 57 are applied. The clutch plate speed is calculated in accordance with the following calculation.

$$ds/dt = K \cdot (Ned - Ne) \text{ (K is a constant)}$$

When the actual engine speed Ne is lower than the desired engine speed Ned (Ned > Ne), clutch pressure is reduced to increase the engine speed Ne. More particularly the motor rotational direction setting section 46 applies a disengagement direction signal and the rotational speed setting section 47 applies a signal corresponding to a duty ratio Dd dependent on the clutch plate speed ds/dt. Thus, the DC motor 8 is driven to shift the release lever 7, thereby decreasing the pressure applied to the clutch plate 6 to reduce load on the engine. As a result, the engine speed Ne is increased. On the other hand, when the actual engine speed Ne is higher than the desired speed Ne (Ned < Ne), the motor 8 is rotated in the clutch engaging direction at the duty ratio Dd to increase the clutch pressure to decrease the engine speed Ne. When the actual engine speed Ne is equal to the desired engine speed Ned, the motor rotational direction setting section 46 produces the clutch engaging direction signal and the motor rotational speed setting section 47 produces a signal corresponding to the zero duty ratio $D_O$, so that the clutch position is not changed.

Figure 10:
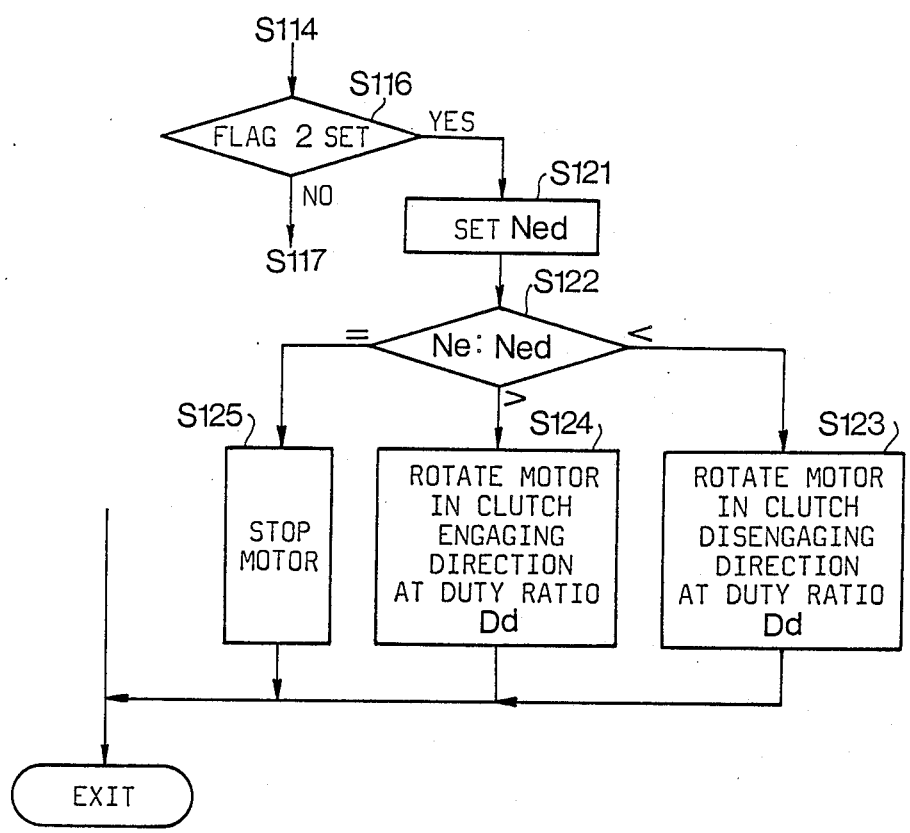
FIG. 10 is a flowchart showing operation during the second region in the modification.

The above described operation is shown in a flowchart of FIG. 10. When it is determined that the flag 2 is set at the step S116 of FIG. 7, the program proceeds to a step S121 where the desired engine speed Ned is determined in dependency on the throttle opening degree $\theta$. The desired engine speed Ned and the actual engine speed Ne are compared at a step S122. When the actual speed Ne is lower than the desired speed Ned, the program goes to a step S123, where the DC motor 8 is driven at the duty ratio Dd in the clutch disengagement direction to increase the engine speed. When the actual speed Ne is higher than the desired speed Ned, the program goes to a step S124 to drive the DC motor 8 at the duty ratio Dd in the clutch engaging direction, thereby decreasing the engine speed Ne. If the actual speed Ne is equal to the desired speed Ned, the clutch 3 is kept at the same position in accordance with the duty ratio $D_O$ at a step S125. Consequently, the clutch plate position S during the second zone II can be changed so as to gradually approach the flywheel 4.

Thus, in the clutch partial engagement state, the engine speed is prevented from rapidly decreasing so as to improve the driveability. Since the desired engine speed is determined in accordance with the engine load, an appropriate clutch plate position dependent on the engine load is obtained.

Figure 11:
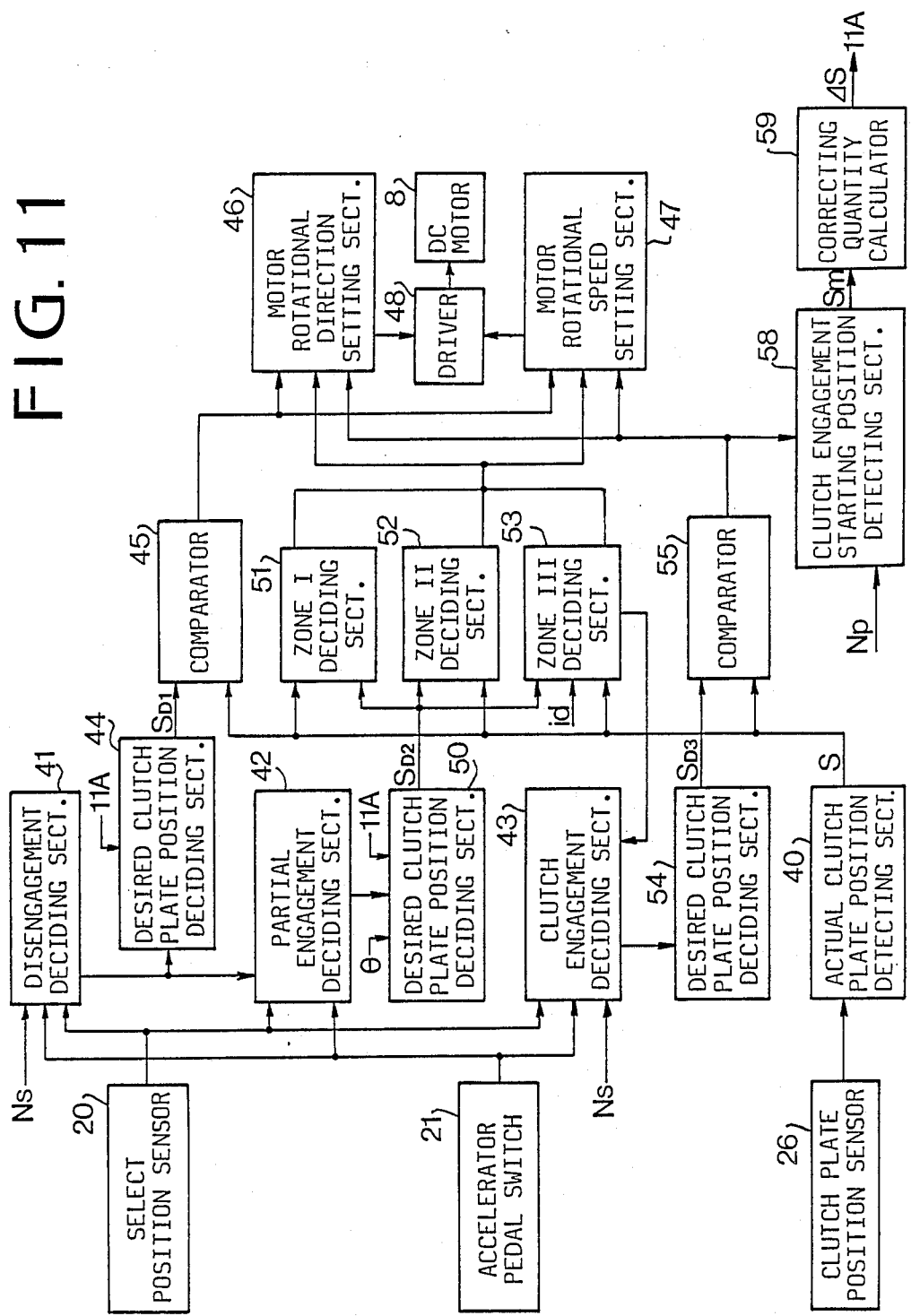
FIG. 11 is a block diagram showing a part of a control unit of a second modification of the present invention.
Figure 13:
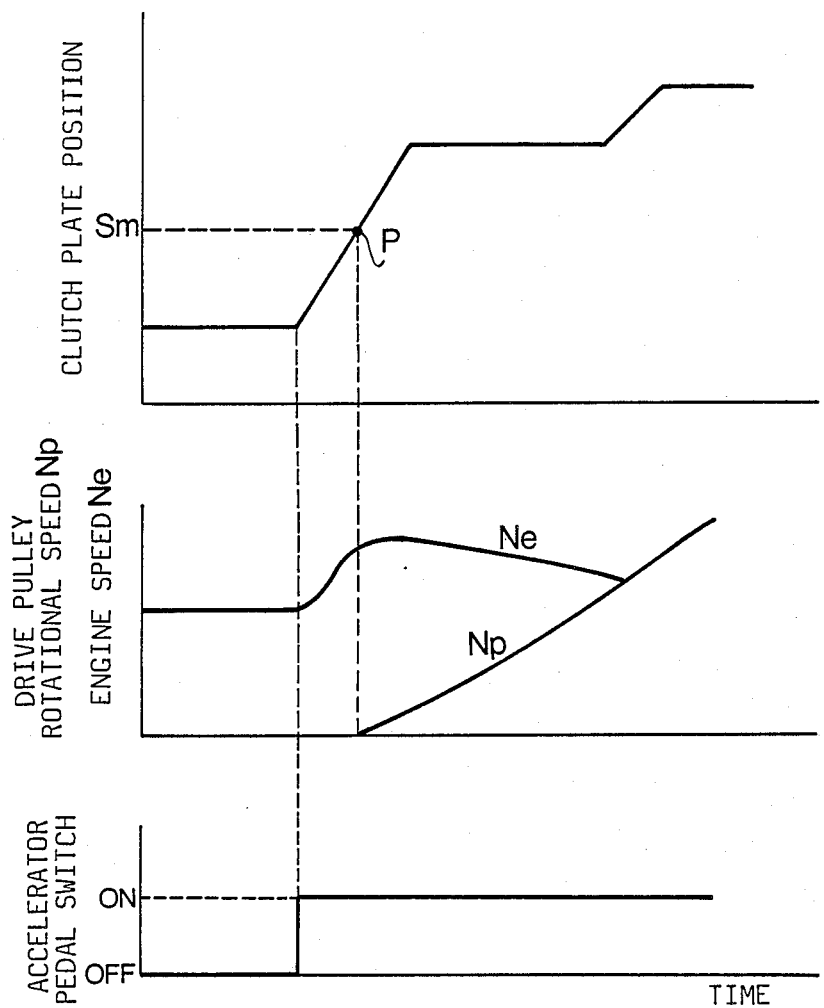
FIG. 13 is a graph showing the variation of clutch plate position in the second modification.

Referring to FIG. 11, a second modification of the present invention is provided with a learning control system for compensating dimensional variances of elements of the clutch which occur during manufacturing of the clutch, and deformation due to abrasion with elapse of time. The control unit has, in addition to sections of FIG. 2a and 2b, a clutch engagement starting position detecting section 58 to which the output driving signal from the comparator 52 and the drive pulley rotational speed $N_P$ from the sensor 24 are applied. A clutch position Sm of a clutch engagement starting point P (FIG. 13) at which the drive pulley 12 of the transmission 10 starts to rotate with the partial engagement of the clutch 3 is detected at the detecting section 58. As shown in FIG. 13, if the surfaces of the flywheel 4 and the clutch plate 6 are abraded, the engagement starting point P shifts ahead and the release lever 7 is shifted. Thus, the abrasions and displacement of the engagement starting point P are detected.

The clutch plate position Sm representing the point P is fed to a correcting quantity calculator 59 and stored in a memory. A correcting quantity $\Delta Sn$ is calculated as follows.

$$\Delta Sn = Sm - Sm'$$

where Sm' is a clutch plate position obtained at the last program. A weighted average $\Delta S$ is calculated from the correcting quantity $\Delta Sn$ and the correcting quantity $\Delta S'$ obtained at the previous program in accordance with $$\Delta S = \{(n-1) \cdot \Delta S' + \Delta Sn\}/n$$

The correcting quantity ΔS is applied to the desired clutch position deciding sections 44 and 50 for the clutch disengagement state and the clutch partial engagement state, respectively. Thus, desired clutch positions $S_{D1}'$ and the $S_{D2}'$, which are desired clutch positions at the last program, are corrected as follows.

$$S_{D1} = S_{D1}' + \Delta S$$

$$S_{D2} = S_{D2}' + \Delta S$$

Figure 12A:
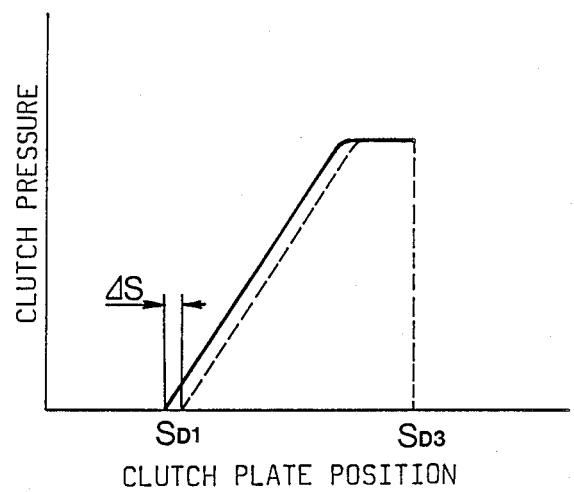
FIGS. 12a and 12b show correction of the desired clutch position in the second modification.
Figure 12B:
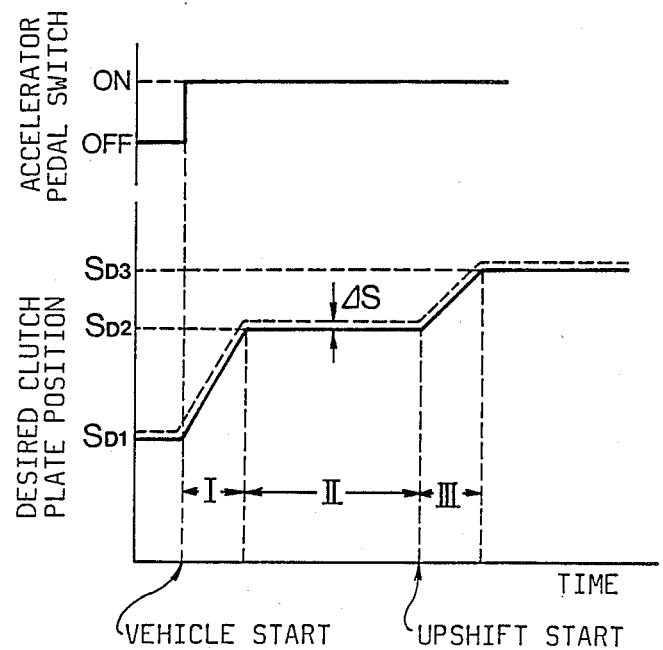

Referring to FIG. 12b, when the clutch 3 is deformed by the abrasion, the clutch characteristic changes to a dashed line. The correcting quantity ΔS dependent on the change is calculated in the correcting quantity calculator 59 so as to correct the desired clutch position $S_{D1}$ for the clutch disengagement state and the desired clutch position $S_{D2}$ for the clutch partial engagement state as shown by a dashed line in FIG. 12b. Since the correcting operation is carried out each time the vehicle is started, the control of the clutch is accurately performed.

From the foregoing, it will be understood that in accordance with the present invention, there is provided a system for controlling a dry-plate friction clutch where a shock which occurs when the clutch is suddenly locked up is prevented. Actual clutch position is applied to the control system so as to carry out a feedback control, thereby accurately operating the clutch to engage and to lock-up. The position of the clutch plate is rapidly changed from the disengagement state to the partial engagement state so as to hasten the start of the vehicle. Moreover, during a partial engagement state control, the desired clutch position can be varied in dependency on the throttle opening degree at the start of the vehicle so that starting characteristic is improved.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. In a control system of a friction clutch connected between an engine and driving wheels of a motor vehicle having a throttle valve mounted on said engine for controlling air-fuel mixture, a throttle valve opening degree sensor for detecting an opening degree of said throttle valve and for producing a corresponding throttle signal, a continuously variable transmission with a primary pulley operatively connected to said engine and a secondary pulley connected to said wheels for transmitting power from said engine to said wheels via said friction clutch, a primary pulley speed sensor for detecting speed of said primary pulley and for producing a primary speed signal, a secondary pulley speed sensor for detecting speed of said secondary pulley and for producing a secondary speed signal, a transmission ratio control system for changing transmission ratio of said continuously variable transmission to a desired transmission ratio and for producing a desired transmission ratio signal, an accelerator pedal connected to said throttle valve and mounted on said motor vehicle for controlling said power, an accelerator pedal switch connected to said accelerator pedal for producing an accelerator signal when said accelerator pedal is depressed, a select position sensor mounted on said transmission for producing a select position signal of a range which is selected, an actuator for operating a clutch plate of said friction clutch, and a clutch plate position sensor for detecting an actual position of said clutch plate and producing an actual position signal, the improvement in said control system which comprises:

a disengagement deciding section responsive to said secondary speed, said select position and said accelerator signals for producing a disengagement signal;

a partial engagement deciding section responsive to said select position, said accelerator and said disengagement signals for producing a partial engagement signal;

first means responsive to said disengagement signal for deciding a first desired position of said clutch plate and producing a first desired signal;

second means responsive to said partial engagement and said throttle signals for deciding a second desired position of said clutch plate and for producing a second desired signal;

zone deciding means responsive to said second desired and said actual position signals for deciding a first desired pattern of engaging said clutch from disengagement to a predetermined partial engagement of said clutch at the second desired position of said clutch plate so as to shift said clutch plate to said second desired position of said clutch plate at said partial engagement of said clutch at a maximum speed and to maintain said partial engagement for a predetermined time;

another zone deciding means responsive to said second desired, said actual position and said desired transmission ratio signals for deciding a second desired pattern of engaging said clutch from said partial engagement to an entire engagement of said clutch and for producing a pattern signal so as to shift said clutch plate at a constant speed;

clutch engagement deciding means responsive to said secondary speed, said select position, said accelerator and said pattern signals for deciding a third desired position of said clutch plate and for producing a third desired signal;

a first comparator responsive to said first desired and said actual position signals for producing a first driving signal to actuate said actuator according to said first desired pattern; and a second comparator responsive to said third desired and said actual position signals for producing a second driving signal to actuate said actuator according to said second desired pattern.

2. The system according to claim 1 further comprising upshift detector means for producing an upshift signal when the transmission starts to upshift, and said another zone deciding means responds to the upshift signal to shift the clutch plate to the entire engagement.

3. The system according to claim 1, further comprising desired engine speed providing means, and said first-mentioned zone deciding means controls the position of the clutch plate at the partial engagement so as to keep actual engine speed substantially at the desired engine speed.

4. The system according to claim 3, wherein the desired engine speed providing means comprises a throttle position sensor.

5. The control system according to claim 1, further comprising
   a clutch engagement starting position detecting means responsive to said second driving and said primary speed signals for producing a present clutch plate position signal and a last clutch plate position signal; and
   a calculator responsive to said present and said last clutch plate position signals for calculating a correcting quantity to compensate dimensional variances of said clutch and for producing a correcting quantity signal for said first and second means.

6. The control system according to claim 1, wherein said second means is responsive to said throttle signal for establishing said second desired position at said partial engagement of the clutch as a function of the opening degree of the throttle valve.

7. The control system according to claim 6, wherein said second desired position is an increasing function of the opening degree of the throttle valve at the start of the vehicle.

8. The control system according to claim 7, wherein said second desired position is maintained when the transmission ratio is at a maximum.

9. The control system according to claim 1, wherein said another zone deciding means is responsive to said second desired, said actual position and said desired transmission ratio signals for deciding said second desired pattern of engaging said clutch at an increased engagement rate to as to lock up the clutch at the same time when the desired transmission ratio becomes smaller than a largest transmission ratio of the transmission.

* * * * *